US011931658B2

(12) United States Patent
Smit (10) Patent No.: US 11,931,658 B2
(45) Date of Patent: Mar. 19, 2024

(54) FRAME FOR SIMULATOR HAVING GUIDES AND DEVICE FOR FIXATING A SEAT OR A STEERING WHEEL SLIDABLE ALONG SAID GUIDES

(71) Applicant: F. SMIT HOLDING B.V., Doetinchem (NL)

(72) Inventor: Fernando Smit, Doetinchem (NL)

(73) Assignee: F. SMIT HOLDING B.V., Doetinchem (NL)

( * ) Notice: Subject to any disclaimer, the term of this patent is extended or adjusted under 35 U.S.C. 154(b) by 245 days.

(21) Appl. No.: 17/606,841

(22) PCT Filed: Apr. 28, 2020

(86) PCT No.: PCT/EP2020/061782
§ 371 (c)(1),
(2) Date: Oct. 27, 2021

(87) PCT Pub. No.: WO2020/221757
PCT Pub. Date: Nov. 5, 2020

(65) Prior Publication Data
US 2022/0219077 A1 Jul. 14, 2022

(30) Foreign Application Priority Data
Apr. 29, 2019 (NL) ...................... 2023027

(51) Int. Cl.
*A63F 13/98* (2014.01)
*A47C 15/00* (2006.01)
*A63F 13/803* (2014.01)

(52) U.S. Cl.
CPC ............ *A63F 13/98* (2014.09); *A47C 15/004* (2013.01); *A63F 13/803* (2014.09)

(58) Field of Classification Search
CPC ....... A63F 13/98; A63F 13/803; A47C 15/004
(Continued)

(56) References Cited

U.S. PATENT DOCUMENTS 1,996,074 A 4/1935 La Salle
5,522,641 A * 6/1996 Infanti ................. A47C 15/004
297/344.13
(Continued)

FOREIGN PATENT DOCUMENTS

DE 102007056378 B3 3/2009
GB 2483876 A 3/2012
TW 201109226 A * 3/2011 ................ B62J 1/00

OTHER PUBLICATIONS

International Preliminary Report on Patentability for the International Patent Application No. PCT/EP2020/061782, dated Nov. 2, 2021, 6 pages.
(Continued)

*Primary Examiner* — Anthony D Barfield
(74) *Attorney, Agent, or Firm* — KDW Firm PLLC (57) ABSTRACT

A frame for a simulator includes first and second guides and subframes for a seat and for a steering wheel which are slidable in the frame along the guides. The subframes include fixation devices. Each fixation device includes a fixation member which extends on either side of the respective guide and which has a recess through which the guide protrudes. The fixation member is pivotable about an axis oriented perpendicularly of the guide between a release position, in which mutually opposite edges of the recess lie at a distance from the guide, and a fixation position in which the edges engage on mutually opposite sides of the guide. A subframe slidable along a guide for use in such a frame. A fixation device for use in such a frame.

12 Claims, 6 Drawing Sheets

(58) Field of Classification Search
USPC .......................................................... 297/337
See application file for complete search history.

(56) References Cited

U.S. PATENT DOCUMENTS

| | | |
|---|---|---|
| 6,227,614 B1 | 5/2001 | Rubin |
| 2006/0186720 A1 | 8/2006 | Linardi et al. |
| 2017/0056763 A1 | 3/2017 | Smit |

OTHER PUBLICATIONS

International Search Report and Written Opinion for International application No. PCT/EP2020/061782, dated Aug. 25, 2020, 10 pages.

* cited by examiner

FRAME FOR SIMULATOR HAVING GUIDES AND DEVICE FOR FIXATING A SEAT OR A STEERING WHEEL SLIDABLE ALONG SAID GUIDES

This application is a national stage filing under 35 U.S.C. 371 of pending International Application No. PCT/EP2020/061782, filed Apr. 28, 2020, which claims priority to Netherlands Patent Application No. NL 2023027, filed Apr. 29, 2019, the entirety of which is incorporated by reference herein.

The invention relates to a frame for a simulator, particularly a vehicle or aircraft simulator, comprising at least one first guide and/or at least one second guide, a subframe for a seat slidable in the frame along the at least one first guide and/or a subframe for a control member, such as a steering wheel, slidable in the frame along the at least one second guide, wherein the subframe for the seat and/or the subframe for the control member comprise(s) a fixation device.

Simulators are known in different variants. Examples are racing simulators and flight simulators, which can both find application in professional as well as hobby use. For simulators intended for use by multiple people it is of great importance that they can be made suitable for the different users, wherein, irrespective of his or her build, each user can adopt a sitting posture which is realistic for the simulated activity. For this purpose the seat and/or the control members must be adjustable over a wide reach in the frame of the simulator. It is also important here that adjusting of a desired position can be carried out quickly and that an adjusted position can be held in reliable manner.

Systems are already known for adjusting different positions of for instance a seat or a steering wheel in a frame of a simulator, wherein use can be made of pins and a series of holes for the purpose of fixating the adjusted position. Because of this, only a number of predetermined positions can be taken up. Also known are adjusting and fixation systems on the basis of a gear rack and a cam or pawl engaging therein, but these also have only discrete positions, there moreover being a risk here of the seat or the steering wheel coming loose when the cam or pawl does not engage properly in a space between two teeth.

Prior art document US 2006/186720 A1 discloses a translation movement guidance mechanism with positional locking for an adjustable headrest of an automobile seat. The headrest has two stems of which lower ends are attached to the backrest of the seat in fixed bushes. A locking component includes two more or less parallel bearing elements which exert a gripping force on two diametrically opposite sides of each stem.

The invention now has for its object to provide a frame for a simulator having a device for fixating e.g. a seat or steering wheel slidable along a guide wherein said problems do not occur, or at least do so to lesser extent. According to the invention, this is achieved in a frame for a simulator of the type described in the preamble in that the fixation device comprises at least one fixation member which extends on either side of the respective guide and which has a recess through which the guide protrudes, wherein the at least one fixation member is pivotable about an axis oriented substantially perpendicularly of the guide between a release position, in which mutually opposite edges of the recess lie at a distance from the guide, and a fixation position in which the edges engage on mutually opposite sides of the guide. Due to the engagement of the mutually opposite edges of the recess on the guide, the fixation member, and thereby also the fixation device, can be fixated on the guide in any desired position. By then pivoting the fixation member to its release position, in which the edges of the recess lie removed from the guide, the fixation device—and the subframe for the seat or steering wheel connected thereto—can be displaced along the guide to another desired position.

In an embodiment of the frame, the fixation device can be provided with biasing means for urging the at least one fixation member to its fixation position, and with an operable release member for moving the at least one fixation member to its release position. An adjusted position of the slidable object is thus held until a user operates the release member in order to slide the object to a different position.

The biasing means can comprise at least one spring, particularly a compression spring, co-acting with the at least one fixation member, while the operable release member can comprise at least one pressing or pulling element co-acting with the at least one fixation member.

For a stable fixation the fixation member can extend all around the guide, and the recess can be a continuous opening.

In order to prevent a moment being exerted on the guide during use of the fixation device, this device can be provided with two fixation members pivotable in opposite directions. These two fixation members act on a single guide.

In order to limit the number of separate components of the fixation device in that case, a joint spring, particularly a compression spring, can be arranged between the two fixation members.

Instead or in addition, a joint pressing or pulling element can be arranged between the two fixation members. In the case that the joint element is a pressing element, it can comprise a rotatable shaft with two cams lying opposite each other.

In an embodiment of the simulator frame the at least one fixation member, the biasing means and the operable release member can be received in a common housing which extends at least partially around the guide.

An easily assembled fixation device is obtained when the at least one fixation member is received in the housing for free movement and is positioned against a stop by means of at least one spring.

A compact construction is obtained when at least one bearing for the guide is received in the housing of the fixation device.

The invention further relates to a subframe for a seat or for a control member, such as a steering wheel, that is slidable along a guide for use in a frame as described above. This subframe may comprise at least one bearing for the guide and a fixation device which co-acts with the guide.

Finally, the invention relates to a fixation device for use in a frame of the above described type.

The invention is elucidated hereinbelow on the basis of a number of embodiments, wherein reference is made to the accompanying drawing, in which corresponding components are designated with reference numerals increased by 100, and in which.

Figure 8:
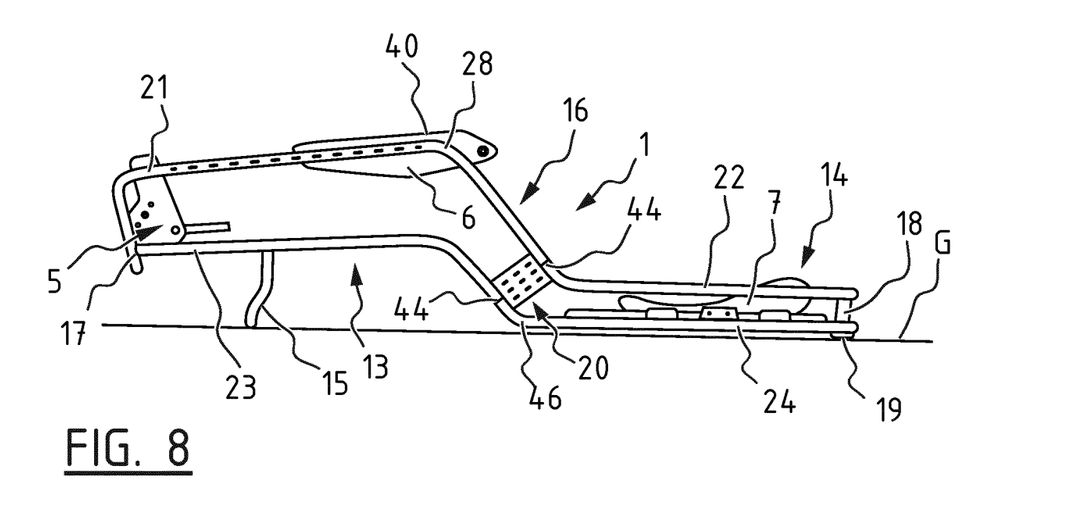
FIG. 8 is a side view of a frame for a simulator in accordance with an embodiment of the invention.
Figure 9:
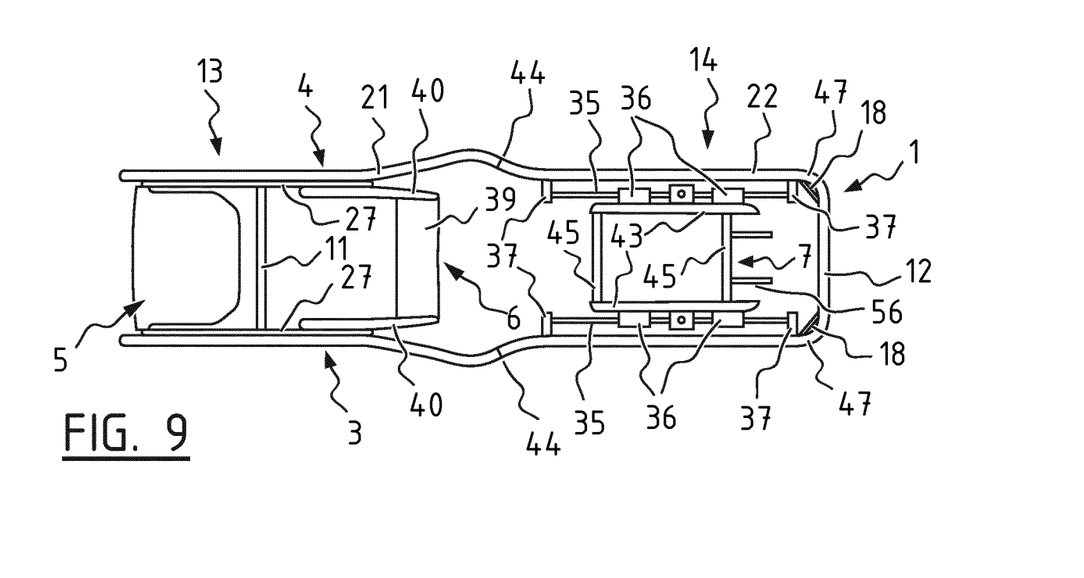
FIG. 9 is a top view of the frame of FIG. 8.
Figure 10:
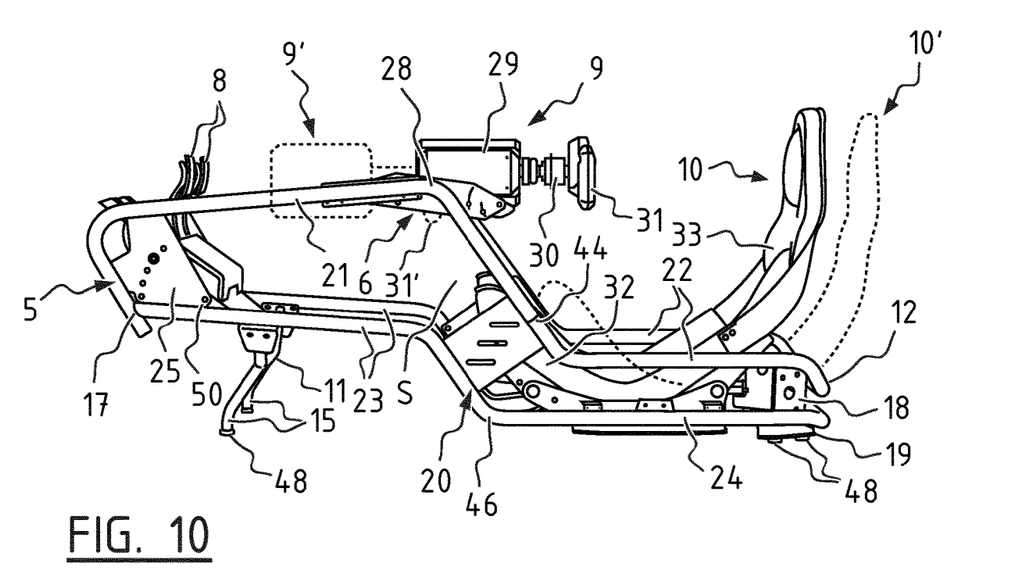
FIG. 10 is a perspective side view of the frame of FIGS. 8 and 9 with a seat mounted therein, a control unit and a pedal set.

A frame 1 for a simulator in accordance with an embodiment of the invention comprises two side parts 3, 4 and three subframes 5, 6, 7 arranged therebetween (FIG. 8, 9). Front subframe 5 is mounted non-movably on side parts 3, 4 and forms a support for pedals 8 (FIG. 10). A middle subframe 6 is slidable in longitudinal direction of frame 1 and forms a support for a manual control unit 9. Rear subframe 7 is likewise slidable in longitudinal direction of frame 1 and forms a support for a seat 10.

In the shown embodiment frame 1 is further provided with transverse frame parts 11, 12 which connect the elongate side parts 3, 4 to each other close to their front and rear outer ends. Frame 1 further has a front frame part 13 which carries the pedal subframe 5 and the subframe 6 for the manual control unit, and a rear frame part 14 which carries the seat subframe 7. In this embodiment front frame part 13 lies higher above a ground surface G than rear frame part 14. At the position of front transverse part 11 frame 1 is therefore provided with two legs 15 with which front frame part 13 supports on the ground G. Between front frame part 13 and the lower-lying rear frame part 14 the frame has an inclining connecting segment 16.

In the shown embodiment frame 1 is constructed from tubular elements which are bent in suitable manner so as to obtain the desired shape of frame 1. The elongate side parts 3, 4 of the frame are here in each case constructed from two substantially parallel tubular elements, respectively 21, 22 and 23, 24, placed one above the other, whereby side parts 3, 4 have a certain height and can withstand deformation. The respective upper and lower tubular elements 21, 22 and 23, 24 are welded together on the front side of frame 1, at front end 17 of lower tube 23, and in addition connected to each other by pedal subframe 5. In the rear part 14 of frame 1 the upper and lower tube 22, 24 are connected to each other by welded stiffening elements 18 which are provided on their underside with legs 19. Just as the front legs 15, these rear legs 19 are provided with rubber caps 48.

In the shown embodiment front and rear frame parts 13, 14 are connected releasably to each other. Arranged for this purpose on either side of frame 1 are fastening members 20, these in each case connecting the two upper tubular elements 21, 22 and the two lower tubular elements 23, 24 to each other and thus bridging a division 44 in frame 1.

As stated, the subframe 6 for manual control unit 9 is slidable in longitudinal direction of frame 1. In the shown embodiment two guide rails or second guides 27, along which subframe 6 for manual control unit 9 is slidable, are for this purpose welded on the inner side of the upper tubular elements 21. These second guides 27 extend rearward substantially from pedal subframe 5, up to a bend 28 in tubular elements 21 which forms the transition from front frame part 13 to inclining part 16. Steering wheel subframe 6 is slidable along guide rails 27 by means of bearings which are arranged on spacers 40, between which a carrier 39 for manual control unit 9 is arranged. Subframe 6 can be fixated in a desired position by means of a fixation device 2 to be discussed below.

In the shown embodiment the manual control unit 9 is otherwise formed by a housing 29 on which a hub 30 and a steering wheel 31 can be fixedly snapped. The steering wheel 31 can be a replica of the steering wheel of a formula car. The manual control unit can further be provided with paddle shifters 34 behind steering wheel 31.

As stated, the subframe 7 for seat 10 is also slidable in longitudinal direction of frame 1. This subframe 7 has for this purpose bearings 36 on either side, which are slidable along a guide rail or first guide 35 which is welded by means of spacers 37 to the inner side of the bottom tubular element 24 in rear frame part 14. Bearings 36 are mounted on wings 43 of subframe 7, which are connected to each other by a number of transverse rods 45 and thus form a base for a seat surface 32 of seat 10. Two rearward protruding backrest supports 56, which support a backrest 33 of seat 10, are also mounted on rear transverse rod 45. The subframe 7 for seat 10 can be fixated in a desired position by means of a similar fixation device 2 as the subframe 6 with steering wheel 31. Guide rails 35 here once again extend over substantially the whole length of rear frame part 14, from a bend 46 in the lower tubular element 24 which forms the transition from the rear frame part 14 to the inclining frame part 16, to a position close to a bend 47 which forms the transition between the part of the tubular element 24 which forms part of the side part 3, 4 and the part of this same tubular element 24 which forms the rear transverse frame part 12.

Because both subframe 6 for manual control unit 9 and subframe 7 for seat 10 are slidable in frame 1 over relatively great lengths, the getting in and out can on the one hand be simplified, while every user can in addition easily find a suitable position for use of the simulator. By unlocking fixation device 102 of subframe 6 and sliding subframe 6 forward as far as possible over guide rails 27 to the front end position shown in broken lines in FIG. 10, and simultaneously unlocking fixation device 2 and sliding subframe 7 of seat 10 rearward as far as possible over guide rails 35 to the rear end position likewise shown in broken lines, a space S in which a user can stand is formed between steering wheel 31 and seat surface 32 of seat 10. The user can here support with his hands on the tubular elements of the inclining middle segment 16 of frame 1. The user can then lower him or herself into seat 10 and extend his or her legs under steering wheel subframe 6 and toward pedal subframe 5.

Once a user is seated in the simulator, subframe 6 can be moved rearward again until steering wheel 31 is at a desired position in longitudinal direction of frame 1. Simultaneously, subframe 7 of seat 10 can be moved forward so that the user ends up sufficiently close to steering wheel 31. Steering wheel 31 is then positioned roughly at the position of a transition between seat surface 32 and backrest 33 of the seat, which is a realistic position for a formula car. Subframes 6, 7 can then be fixated by means of their fixation devices 2, 102, after which the user can use the simulator.

Figure 1:
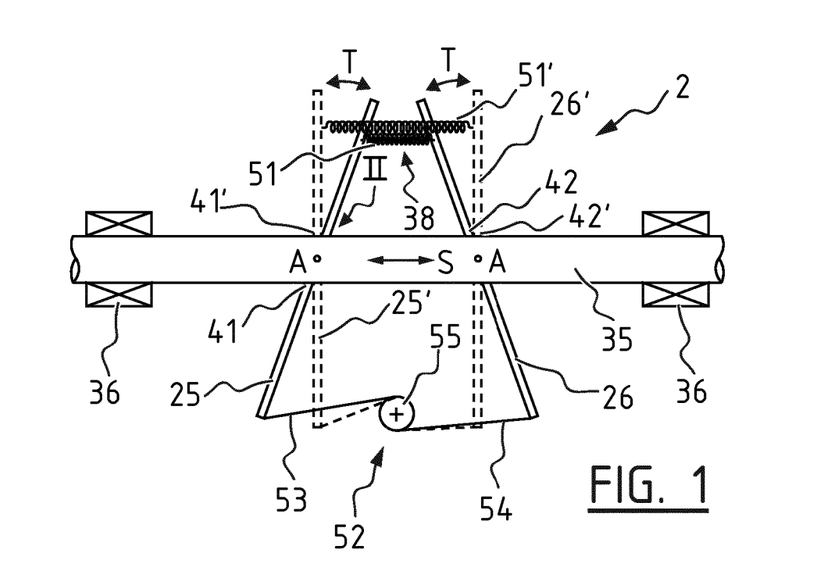
FIG. 1 is a schematic view showing the operating principle of a fixation device for use in the frame of the invention.

In the shown embodiment the fixation device 2 for the subframe 7 of seat 10 comprises two fixation members 25, 26 which each have a recess 41, 42 through which the first guide 35 protrudes (FIG. 1). Fixation members 25, 26 each have a fixation position in which mutually opposite edges 49, 50 of recesses 41, 42 engage on mutually opposite sides of the guide. From the fixation position, fixation members 25, 26 are each pivotable in the direction of the arrow T about an axis A, which is perpendicular of first guide 35, to a release position (shown in broken lines) in which edges 49, 50 of recesses 41, 42 lie at a distances from first guide 35. In this release position the fixation device 2 can slide relative to first guide 35 in the direction of arrow S.

Figure 2:
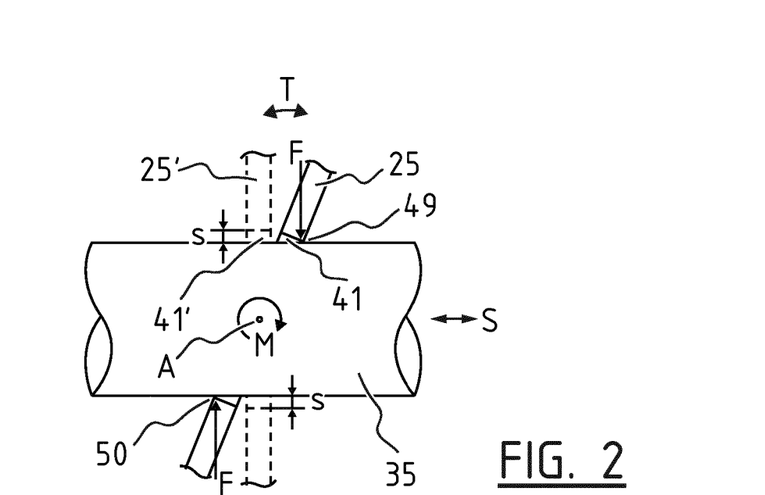
FIG. 2 is a detail view on enlarged scale along arrow II in FIG. 1.

In the fixation position the edges 49, 50 exert opposing forces F on first guide 35, which is thereby clamped fixedly (FIG. 2). These opposing clamping forces F also generate a moment M. Because fixation device 2 has two fixation members 25, 26 pivotable in opposite directions, which members generate opposing and mutually counteracting moments M, no resulting moment will ultimately act on first guide 35.

Fixation members 25, 26 are urged to their fixation position by biasing means 38. In the shown embodiment these biasing means take the form of a single tension spring 51 which pulls the parts of fixation members 25, 26 lying above first guide 35 toward each other.

Figure 4:
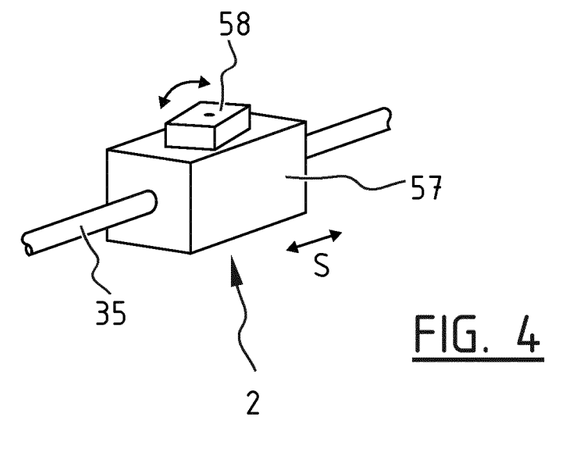
FIG. 4 is a perspective view of a first practical embodiment of the fixation device of FIG. 1 on a guide.

In order to make fixation members 25, 26 pivot to the release position the fixation device 2 is provided with an operable release member 52. In the shown embodiment the release member comprises two pulling elements 53, 54 which can be wound round a spool 55 placed between fixation members 25, 26 in order to pull the parts of fixation members 25, 26 lying under first guide 35 toward each other counter to the biasing force of spring 51. Release member 52 is operated by means of an operating member 58, shown schematically in the form of a rotary knob in FIG. 4. In this embodiment the fixation members 25, 26 are received together with biasing means 38 and release member 52 in a housing 57.

Figure 3:
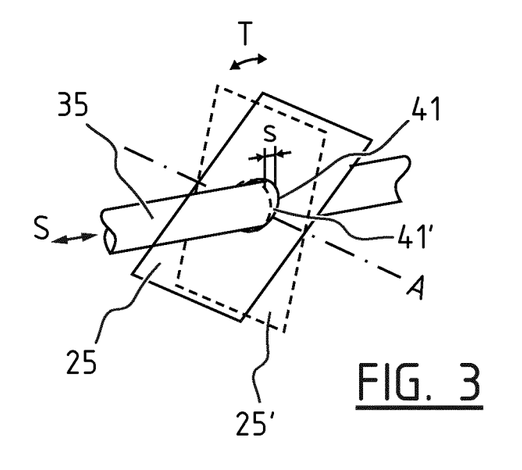
FIG. 3 is a perspective view of a fixation member and a guide protruding therethrough.

As can be seen here, first guide 35 has a round cross-section, and fixation members 25, 26 extend all around this first guide 35. The recesses 41, 42 therefore each take the form here of a continuous opening in the relevant fixation member 25, 26 (FIG. 3).

Figure 6:
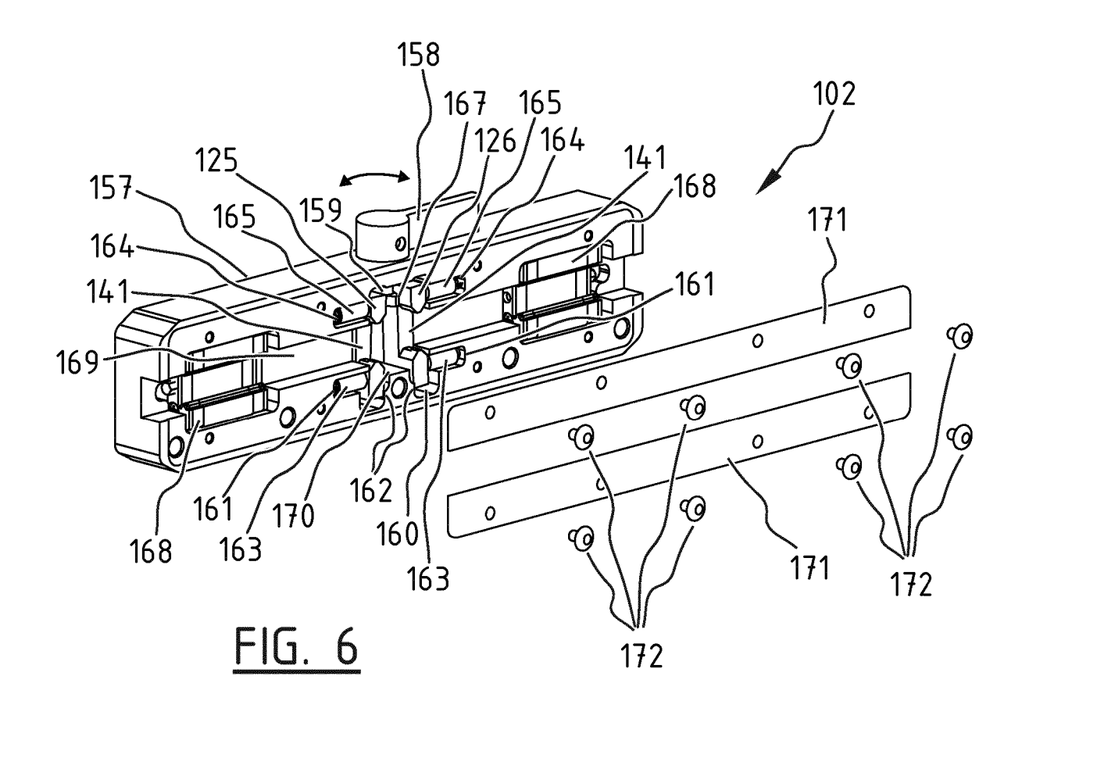
FIG. 6 is a perspective view of the fixation device of FIG. 5 wherein a covering has been removed.

The fixation device 102 for the subframe 6 that carries the steering wheel 31 is shown in FIG. 6. This fixation device 102, which likewise comprises a housing 157, does not enclose second guide 27 wholly, but leaves a side clear. An operating member 158, which operates release member 152, can once again be seen on housing 157.

In this embodiment the fixation members 125, 126 have an open cross-section, with a recess 141, 142 for receiving the second guide 27. Fixation members 125, 126 are relatively thick and robust, but for the purpose of achieving a high clamping force the mutually opposite edges 149, 150 of the recesses take a tapering form. Fixation members 125, 126 are here received in housing 157 for free movement in corresponding cavities 159, 160, and at their lower ends are each pressed by means of a spring 161 against a stop 162. Springs 161 do not engage directly on the fixation members, but with interposing of plungers 163. Each of the plungers 163 engages on the respective fixation member 125, 126 at a point above the corresponding stop 162, so that the springs 161 urge the fixation members 125, 126 pivot towards each other to their fixation position, with the stops 162 serving as fulcrums.

Figure 5:
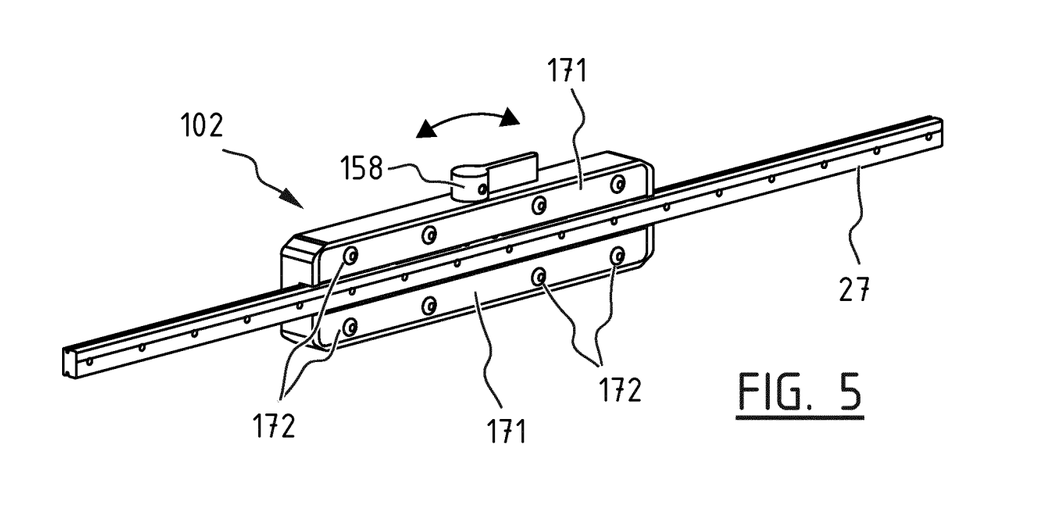
FIG. 5 is a perspective view of a second embodiment of the fixation device on a different type of guide.

The opposite outer ends of the fixation members are urged to their fixation position by biasing means 138 in the form of compression springs 164, likewise with interposing of plungers 165. The operable release member 152 is here formed by a central shaft 166 which is connected to rotary knob 158 and which is rotatable in a central space 170 between fixation members 125, 126. This shaft 166 (shown in a lowered position in FIG. 7, but normally extending through opening 173 into rotary knob 158) has two diametrically opposed cams 167. During use these cams 167 each engage on an upper end of one of the fixation members 125, 126 to urge them apart when the rotary knob 158 is rotated over a quarter turn from the position shown in FIGS. 5-7. In this way the fixation members 125, 126 are pivoted to their release position.

Figure 7:
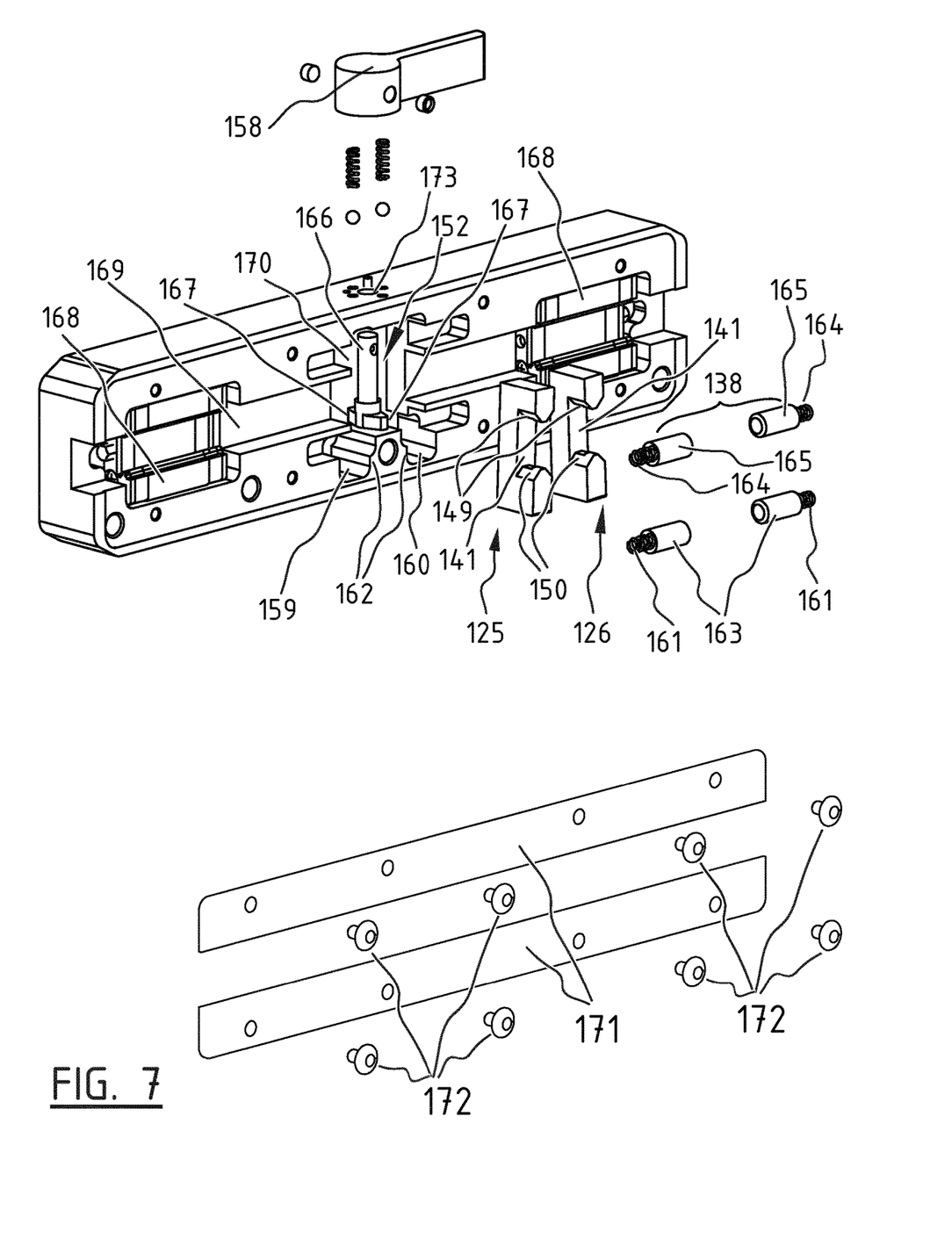
FIG. 7 is a view corresponding to FIG. 6 with further exploded parts.

In this embodiment the bearings 168 with which fixation device 102 (and the subframe 6 connected thereto) are slid along second guide 27 are also received in housing 157. These bearings 168 are received on either side of housing 157 in a continuous channel 169, which also crosses the cavities 159, 160 and the central space 170. The different components are retained in housing 157 by means of two closing strips 171 which are fastened with bolts 172.

The invention thus provides a way of fixating slidable components, in particular a seat and one or more control members, such as a steering wheel, in a frame of a simulator in rapid and simple manner. Moreover, the fixation can be undone in an equally rapid and simple manner to allow the components to move to different positions along guides in the frame.

The scope of the invention is defined solely by the following claims.

The invention claimed is:

1. A frame for a simulator, comprising:
   at least one first guide and at least one second guide,
   a subframe for a seat slidable in the frame along the at least one first guide and a subframe for a control member, slidable in the frame along the at least one second guide,
   wherein the subframe for the seat and/or the subframe for the control member comprise(s) a fixation device,
   wherein the fixation device comprises at least one fixation member which extends on either side of the respective guide and which has a recess through which the guide protrudes, and
   wherein the at least one fixation member is pivotable about an axis oriented substantially perpendicularly of the guide between a release position, in which mutually opposite edges of the recess lie at a distance from the guide, and a fixation position in which the edges engage on mutually opposite sides of the guide.

2. The frame according to claim 1, further comprising biasing means for urging the at least one fixation member to its fixation position, and a release member for moving the at least one fixation member to its release position.

3. The frame according to claim 2, wherein the biasing means comprises at least one spring, co-acting with the at least one fixation member.

4. The frame according to claim 2, wherein the release member comprises at least one pressing or pulling element co-acting with the at least one fixation member.

5. The frame according to claim 2, wherein the at least one fixation member, the biasing means and the release member are received in a common housing which extends at least partially around the guide.

6. The frame according to claim 5, wherein the at least one fixation member is received in the housing for free movement and is positioned against a stop by means of at least one spring.

7. The frame according to claim 5, wherein at least one bearing for the guide is received in the housing.

8. The frame according to claim 1, wherein the fixation member extends all around the guide, and the recess is a continuous opening.

9. The frame according to claim 1, further provided with two fixation members pivotable in opposite directions.

10. The frame according to claim 9, further comprising biasing means for urging the two fixation members to the fixation position, and a release member for moving the at two fixation members to the release position, wherein the biasing means comprises at least one spring, co-acting with the at least one fixation member, and wherein a joint spring is arranged between the two fixation members.

11. The frame according to claim 9, further comprising biasing means for urging the two fixation members to the fixation position, and a release member for moving the at two fixation members to the release position, wherein the release member comprises at least one pressing or pulling element co-acting with the two fixation members, and wherein a joint pressing or pulling element is arranged between the two fixation members.

12. The frame according to claim 11, wherein the joint pressing element comprises a rotatable shaft with two cams lying opposite each other.

* * * * *